Oct. 24, 1961     J. J. DOUDERA, JR     3,005,432
METHOD OF AND APPARATUS FOR VENTING SIDE SEAMS OF CAN BODIES
Filed July 21, 1958     5 Sheets-Sheet 1

INVENTOR.
JOHN J. DOUDERA JR.
BY Leland R. McCann
George W. Reiber
ATTORNEYS

INVENTOR.
JOHN J. DOUDERA Jr.

3,005,432
METHOD OF AND APPARATUS FOR VENTING SIDE SEAMS OF CAN BODIES

John J. Doudera, Jr., Union, N.J., assignor to American Can Company, New York, N.Y., a corporation of New Jersey
Filed July 21, 1958, Ser. No. 749,700
4 Claims. (Cl. 113—120)

The present invention relates generally to the manufacture of sheet metal container or can bodies having locked side seams and has particular reference to a method of and apparatus for producing a vent opening in the seams simultaneously with the interfolding of the body edge hooks of the seam to facilitate soldering of the seam.

In the manufacture of can bodies having locked or lock and lap soldered side seams, difficulty is frequently experienced in filling the seam with solder because of air which becomes trapped in the minute spaces between the layers of the hooks in the seam. This trapped air interferes with the capillary action of the solder and thereby causes "islands" or unsoldered portions. This action usually is overcome by providing various forms of vent openings in the seam.

An object of the instant invention is to provide one or more vent openings in the side seam by separating the inner layer of the inner hook from the adjacent layer of the outer hook so as to produce a vent space or spaces leading from the solder entrance edge of the seam into the interior of the seam to facilitate the entrance of solder into the inner regions of the seam.

Another object is to provide a method of and apparatus for producing this separation of the side seam layers simultaneously with the bumping of the interfolded seam hooks on the side seam edges of the can body.

Another object is to provide such a method of and apparatus for venting the side seam in such a manner that the vent opening can be readily utilized in and forms a part of a reenforcing bead formed in and extending across the side seam.

Numerous other objects and advantages of the invention will be apparent as it is better understood from the following description, which, taken in connection with the accompanying drawings, discloses a preferred embodiment thereof.

Referring to the drawings.

Figure 4:
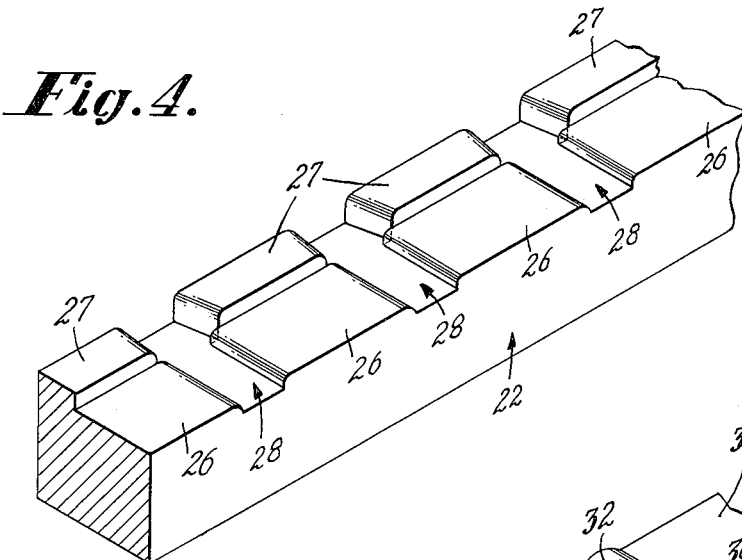
FIGS. 4 and 5 are enlarged fragmentary perspective views of cooperating bumping elements used in the can making machine, the spline element in FIG. 4 being shown in inverted position.
Figure 5:
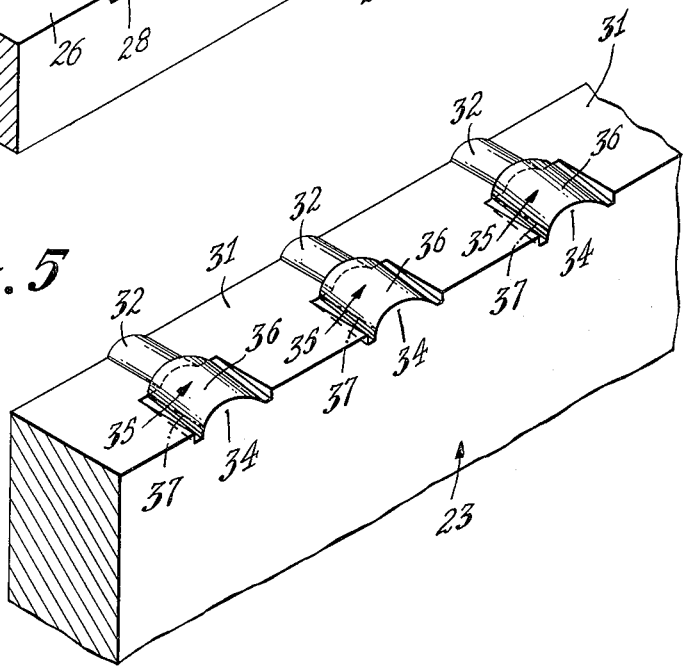
Figure 6:
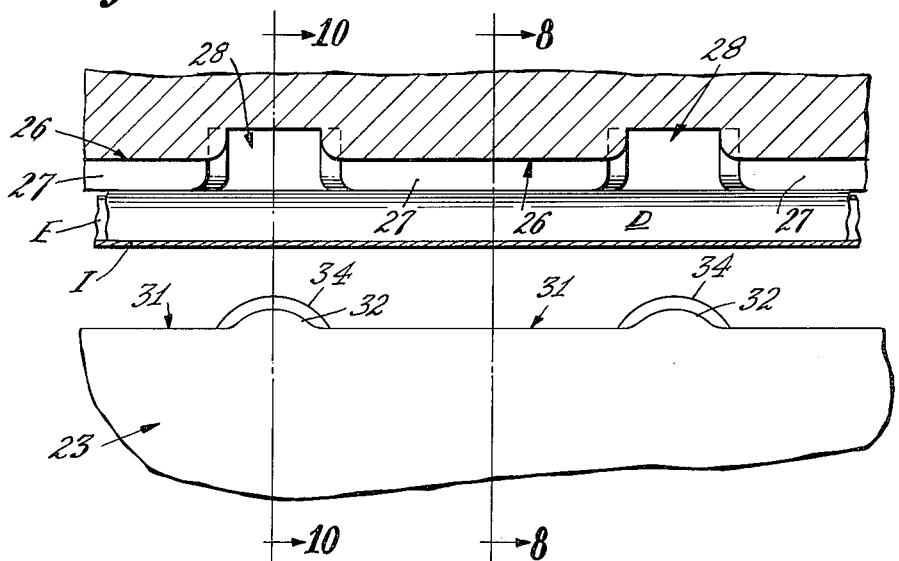
Figure 7:
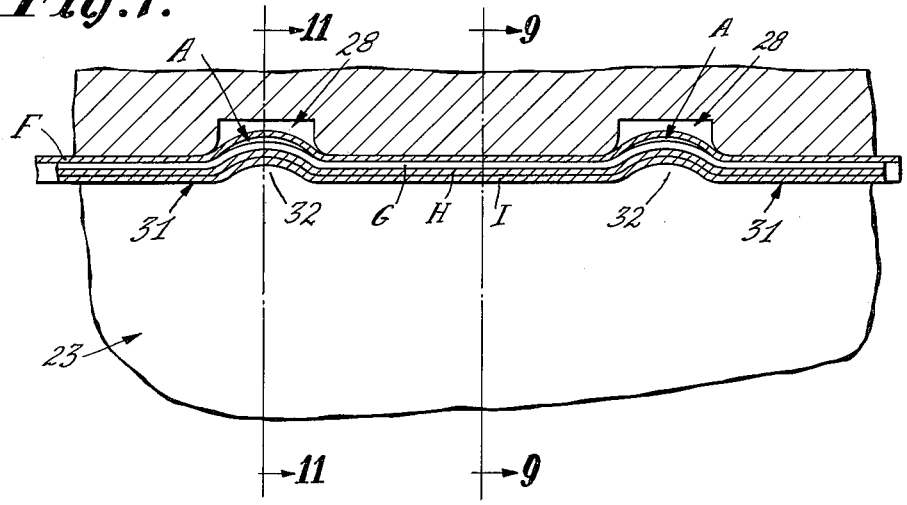
Figure 8:
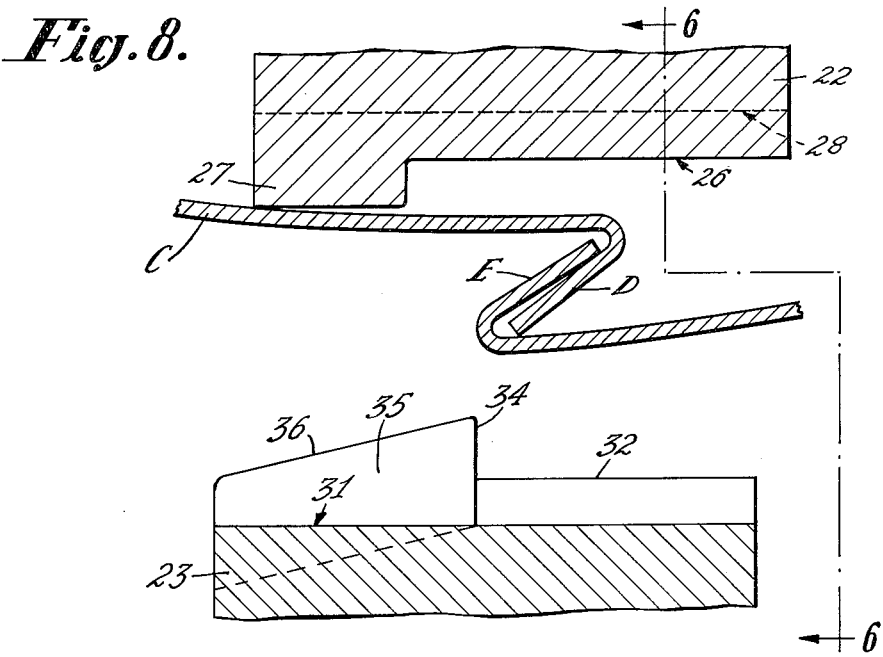
Figure 9:
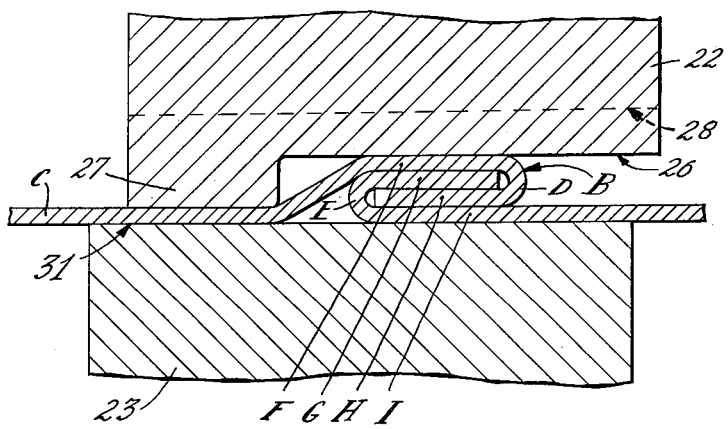
Figure 10:
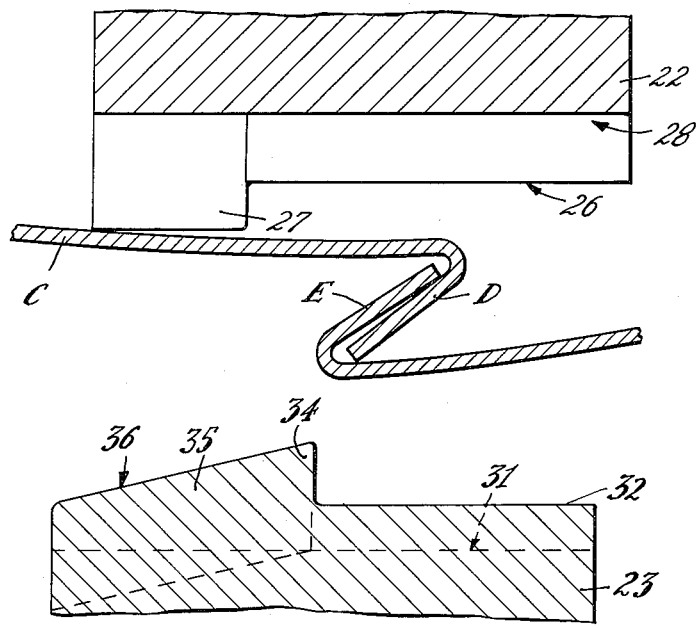
Figure 11:
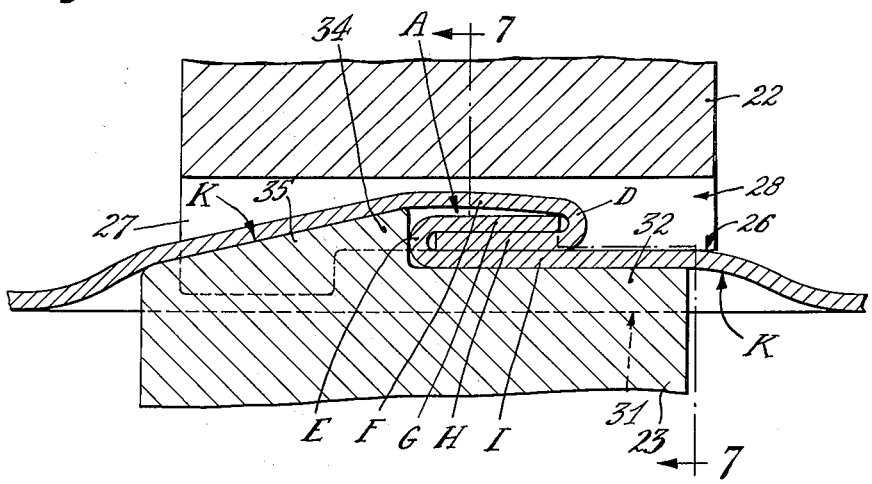

FIGS. 6 and 7 are enlarged longitudinal sections taken through the bumping elements shown in FIGS. 4 and 5 with the elements shown in cooperating poistion and the side seam shown between the elements, FIG. 6 being taken substantially along the line 6—6 in FIG. 8, and showing the relation of the elements and the seam hooks before the bumping operation and FIG. 7 being taken substantially along the line 7—7 in FIG. 11 and showing on a reduced scale the elements and the resulting seam after the bumping operation; and FIGS. 8, 9, 10, 11 are enlarged sectional views taken substantially along the respective lines 8—8, 9—9, 10—10, 11—11 in FIGS. 6 and 7.

As a preferred and exemplary embodiment of the instant invention the drawings illustrate apparatus for and method steps of forming vent openings A (FIGS. 1, 7 and 11) in lock and lap side seams B (FIG. 1) of tubular sheet metal can bodies C. The can bodies C are made on a conventional can body making machine which forms a flat can body blank into tubular shape, bends inner and outer reversely bent hooks D, E (FIG. 8) along the side seam marginal edge portions of the partially formed body, interlocks the hooks as shown in FIG. 8 and then compresses them into a compact side seam B as shown in FIG. 9.

In accordance with the method steps of the invention, the inner and outer side seam hooks D, E of the partially formed can body C are loosely interengaged as shown in FIGS. 8 and 10. The interengaged hooks D, E are then bumped or compressed to produce the side seam B with the hooks interfolded in tightly engaging layers F, G, H, I as shown in FIG. 9. Simultaneously with this bumping action, a portion of the can body, in at least one place along the seam, is bent inwardly by a drawing action, adjacent the inner hook and to one side of the seam, the solder entrance side (at the left as shown in FIG. 11), to reform and separate the innermost layer F of the seam relative to its next adjacent layer G to provide the vent opening A leading into the seam B to facilitate the flow of solder into the seam during a subsequently performed seam soldering operation.

Where it is desired to provide the vent opening A in a portion of a seam B formed with a bead K (FIG. 1), the vent opening A is formed simultaneously with the formation of the bead. For this purpose, all of the layers of the seam, traversely thereof, and the can body portion adjacent and on both sides of the seam, are bent inwardly into a rounded bead shape simultaneously with the inward bending or drawing of the body adjacent the solder entrance side of the seam to reform and separate the innermost layer F of the seam relative to the next adjacent layer G as explained above. Thus in one bending and drawing operation, the vent opening A and the bead K are completed.

Figure 2:
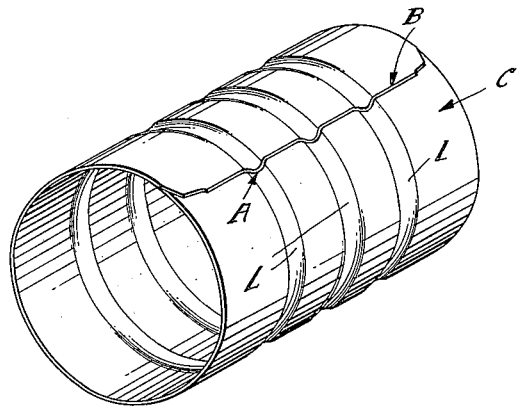
FIG. 2 is a perspective view of a similar can body showing fully formed circumferential reenforcing beads which extend through the beaded side seam.

This beading is effected in order to reenforce the seam B and may also be utilized when the body B is to be subsequently provided with inwardly or outwardly extending circumferential reenforcing beads L, as shown in FIG. 2, to strengthen the side walls of can bodies against collapse when the can is closed under vacuum. In the latter case, the beads L are preferably formed in alignment with the beads K to provide continuous coextensive beads having a pleasing appearance. In such event, the beads K may be designated as started beads or prebeaded sections.

Figure 3:
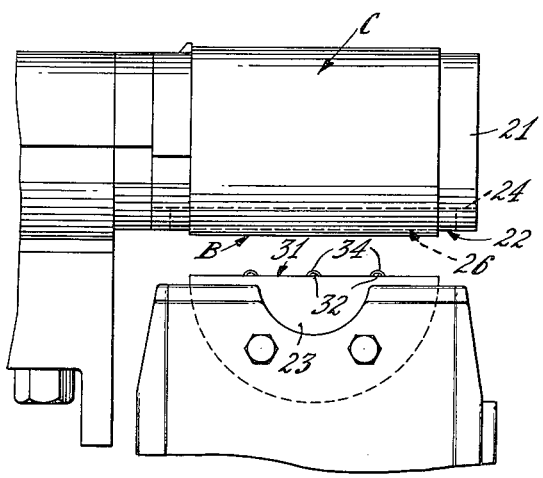
FIG. 3 is a reduced scale fragmentary elevation of principal parts of the side seam forming elements of a can body making machine used in effecting the instant method invention and embodying the apparatus of the invention.

One form of apparatus for carrying out the steps of the instant method invention is disclosed in FIGS. 3, 4 and 5 and primarily comprises a mandrel or horn 21 of a conventional can body making machine, a spline 22 disposed in the mandrel at the bumping station of the machine, and a bumping hammer 23 disposed opposite the spline and movable toward and away from the spline in any suitable manner such as in the conventional body maker.

The mandrel 21 supports the partially formed can body or body blank with its inner and outer hooks D, E interengaged as shown in FIGS. 8 and 10 preparatory to the bumping operation.

The spline 22 is utilized for backing up the interior of the can body C at the side seam B during the bumping operation and is located in a longitudinal groove 24 preferably formed in the bottom of the mandrel directly opposite the bumping hammer 23. This spline preferably is of rectangular configuration and extends along the mandrel for a distance slightly greater than the length of the can body to be bumped.

The spline 22 is provided with a flat smooth lower or bumping face 26 (FIG. 4) having an outwardly stepped portion 27 extending along one edge thereof, as shown in FIGS. 4, 6, 8, 9 and 10, and depending a distance substantially equal to the thickness of the three inner layers F, G, H of the side seam B as shown in FIG. 9. At spaced intervals along the spline its bumping face 26 is provided with spaced and parallel clearance grooves 28 (FIGS. 4, 6 and 7) having a depth greater than the thickness of the side seam B (FIGS. 9 and 11). These grooves 28 preferably are rectangular in cross section, having rounded parallel edges, and extend transversely across the full width of the spline bumping face 26, including the stepped portion 27 thereof. In this stepped portion 27 of the spline 22 the grooves 28 have converging edges spaced apart at the outer edge of the spline a distance substantially equal to the width of the grooves in the flat bumping face portion 26 of the spline and spaced apart at the inner edge of the step 27 a slightly greater distance as is clearly shown in FIG. 4.

Figure 1:
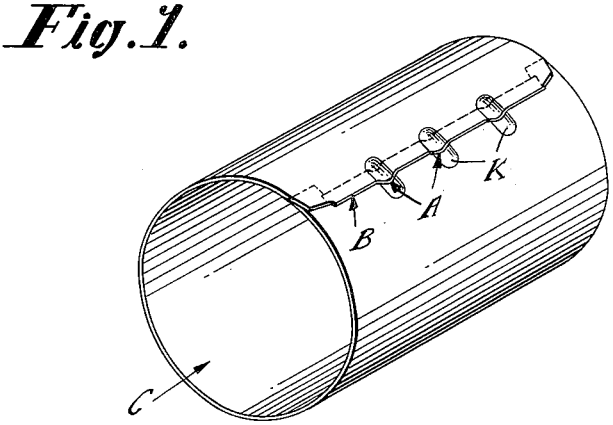
FIGURE 1 is a perspective view of a can body having a lap and lock side seam traversed by a plurality of beads containing vent openings produced by and in accordance with the apparatus and methods steps of the instant invention.

The hammer 23 is provided with a flat upper bumping face 31 which is parallel with and disposed oppositely to the spline bumping face 26 for cooperation therewith in bumping the interengaged hooks D, E of the can body C supported on the mandrel 21. This hammer bumping face 31 preferably is provided with a plurality of spaced and parallel beading lugs 32 (FIGS. 5, 6 and 7) extending transversely of the hammer and which preferably comprise rounded nodes projecting up from the hammer bumping face 31 and located opposite to and in alignment with the clearance grooves 28 extending transversely of the spline bumping face 26. These beading lugs 32 are further located along one edge of the hammer 23 in vertically spaced relation to the portion of the clearance grooves 28 which are disposed in the spline bumping face 26, as indicated in FIGS. 4 and 5. The beading lugs 32 extend up beyond the hammer bumping face 31 a distance equal to the desired depth of the heads K in the completed can body (FIG. 1).

A plurality of longitudinally spaced upstanding transverse protuberances 34 for forming the vent openings A are provided on the hammer bumping face 31, one protuberance being adjacent the end of and disposed in coextensive relation to one of the beading lugs 32 as shown in FIGS. 5 and 10. These vent protuberances 34 project up beyond the beading lugs 32 in stepped relation thereto a distance slightly greater than the thickness of the three outer layers G, H, I of the side seam B as best shown in FIG. 11, and are located in a position adjacent the outer edge of the outer hook E of the interengaged hooks D, E as shown in FIG. 10. The vent protuberances 34 preferably are formed as part of rounded auxiliary beading lugs 35 which extend transversely toward the outer longitudinal edge of the hammer 23 and are inclined relative to the flat hammer bumping face 31. The beading lugs 35 are formed with cylindrically curved outer longitudinal faces 36 (FIG. 5).

Because of the inclination of the beading lugs 35, the plane of the hammer bumping face 31 intersects the faces 36 along tapered lines (indicated by the dotted lines 37 in FIG. 5) which correspond to the tapered edges of the clearance grooves 28 formed in the stepped portion 27 of the spline bumping face 26 (FIG. 4).

Hence, when a can body C is supported on the mandrel 21 as shown in FIG. 3 with its hooks D, E interengaged as shown in FIGS. 8 and 10, the hammer 23 is moved up to engage the interengaged hooks and to bump or compress them against the bumping face 26 of the spline 22 as shown in FIGS. 9 and 11. This bumping action interlocks the hooks D, E tightly as shown in FIG. 9 for a major portion of the length of the resulting side seam B. At the spaced intervals along the seam where the vent openings A are to be formed, the protuberances 34 press and draw the can body metal adjacent the outer edge of the outer hook E, into the spline clearance grooves 28 without engaging the bottom of the grooves and thereby reform or draw the portions of the body at the grooves in such a manner as to impart a "set" to the material, which "set" holds the inner layer F of the seam in spaced relation to the next adjacent layer G and thus results in forming the vent openings A (FIG. 11). For this vent opening forming operation only the protuberances 34 are required in the hammer bumping face 31.

Where the beads K are to be formed in the body for the subsequent circumferential beading operation, the hammer bumping face 31 is provided with the beading lugs 32 and the auxiliary beading lugs 35 as well as with the aforesaid protuberances 34. With this form of hammer bumping face the side seam B and the can body C on both sidses of the seam for a short distance is bent inwardly to form the beads K and simultaneously with this action the protuberances 34 draw the can body metal to produce the bent openings A as above described.

The subsequent circumferential beading of the body preferably is effected in the well known manner by the use of rollers and forms no part of this invention. These circumferential beads L are formed in longitudinal alignment with the beads K at the same depth and comprise continuous extensions of the beads K. This beading of the bodies in no way affects the vent openings A, the vent openings being retained due to the drawing or reforming of the can body material or metal adjacent the seam, so that said vent openings are preserved to facilitate subsequent soldering of the seam.

It is thought that the invention and many of its attendant advantages will be understood from the foregoing description, and it will be apparent that various changes may be made in the form, construction, and arrangement of parts of the apparatus mentioned herein and in the steps and their order of accomplishment of the method described herein, without departing from the spirit and scope of the invention or sacrificing all of its material advantages, the apparatus and method hereinbefore described being merely a preferred embodiment thereof.

I claim:

1. In a can body making machine wherein a tubular can body having oppositely disposed inner and outer marginal hooks is supported on a mandrel and said hooks are interengaged and bumped to form a multiple layer lock and lap side seam, a spline in said mandrel and a vertically movable hammer disposed beneath said spline, said spline and hammer having opposed flat longitudinal faces for bumping said interengaged hooks together to form said side seam: the improvement comprising said spline having an outwardly stepped portion at one side of its said longitudinal bumping face for engaging the side wall of said can body adjacent said side seam, said spline further having at least one transverse clearance groove of a depth greater than the thickness of said side seam extending across said bumping face and through said outwardly stepped spline portion, said hammer face having an upstanding curved protuberance opposing said clearance groove and disposed laterally outwardly of the bend of the outer hook of the interposed interengaged can body hooks, said protuberance projecting vertically above said hammer face to engage the tubular can body wall immediately adjacent said outer hook bend and cooperating with said outwardly stepped spline portion to draw said engaged body portion into said clearance groove to reform and position the innermost hook layer of said side seam in said groove in vertically spaced relation to the next adjacent inner layer of said seam, whereby to form a vent opening extending transversely of and leading into said side seam between said innermost and next adjacent seam layers for venting the seam during a subsequent soldering operation.

2. A can body making machine of the character defined in claim 1, wherein said hammer face is provided with a beading lug disposed longitudinally of and in coextensive relation to said protuberance across said hammer face and facing said clearance groove in said spline, and wherein said curved protuberance projects vertically beyond said beading lug in stepped relation thereto a distance substantially equal to the thickness of the hook portion of said side seam, said beading lug cooperating with said clearance groove to bead the interengaged side seam hooks transversely thereof adjacent to and simultaneously with the forming of said vent opening.

3. The method of forming the multiple layer lock portion of a lock and lap side seam on tubular can bodies, comprising the steps of loosely interengaging the inner and outer marginal hooks of a tubular can body in said side seam lock portion, bumping said interengaged hooks tightly together to complete said seam, and simultaneously with said bumping operation drawing radially inwardly the innermost layer of said seam immediately laterally adjacent the bend of said inner hook to reform and separate said innermost layer from the subjacent inner layer to form an arcuately curved vent opening leading into said side seam to facilitate the flow of solder thereinto during a subsequent seam soldering operation.

4. The method defined in claim 3 with the added step of simultaneously bending said side seam radially inwardly transversely thereof adjacent said vent opening to produce a reenforcing bead in said body extending across said side seam without disturbing the formation of said vent opening.

References Cited in the file of this patent

UNITED STATES PATENTS

| 1,867,857 | Meyers | July 19, 1932 |
| 2,727,537 | Henchert | Dec. 20, 1955 |

FOREIGN PATENTS

| 563,268 | Great Britain | Aug. 4, 1944 |